United States Patent [19]

Iijima et al.

[11] Patent Number: 4,511,920
[45] Date of Patent: Apr. 16, 1985

[54] TELEVISION SIGNAL AMPLITUDE DETECTION CIRCUIT

[75] Inventors: Yukihiko Iijima; Sadame Kobayashi, both of Tokyo, Japan

[73] Assignee: Nippon Electric Co., Ltd., Tokyo, Japan

[21] Appl. No.: 400,147

[22] Filed: Jul. 20, 1982

[30] Foreign Application Priority Data

Jul. 22, 1981 [JP] Japan .................................. 56-113624

[51] Int. Cl.³ .............................................. H04N 7/02
[52] U.S. Cl. ...................................... 358/139; 358/148; 324/77 A
[58] Field of Search ............... 358/139, 153, 148, 154; 324/77 A, 77 B; 307/355, 356, 358

[56]  References Cited
U.S. PATENT DOCUMENTS

| | | | |
|---|---|---|---|
| 3,706,847 | 12/1972 | Smeulers | 178/7.35 |
| 4,110,789 | 8/1978 | Maly | 358/148 |
| 4,319,275 | 3/1982 | Tanaka | 358/154 |
| 4,362,394 | 12/1982 | Menlove | 324/77 A |

Primary Examiner—John C. Martin
Assistant Examiner—Edward L. Coles
Attorney, Agent, or Firm—Blakely, Sokoloff, Taylor & Zafman

[57] ABSTRACT

A television synchronizing signal amplitude detection circuit for detecting the amplitude of composite television signals wherein the period of detection is determined by the vertical synchronizing signal interval including a vertical synchronizing pulse period and an equalizing pulse period preceding and succeeding the vertical synchronizing pulse period.

4 Claims, 5 Drawing Figures

TELEVISION SIGNAL AMPLITUDE DETECTION CIRCUIT

BACKGROUND OF THE INVENTION

This invention relates to a television signal amplitude detection circuit for detecting the amplitude of an input television signal.

With recent advancement of image processing technique and semiconductor technique, image processing systems making use of image processing technique have been developed in various fields. In these image processing systems, their characteristics and performance are liable to be impaired if the amplitude of the input television signal becomes excessive or insufficient with respect to a prescribed television signal amplitude range. For this reason, determination as to whether the input television signal amplitude is within the prescribed amplitude range is important in order to maintain satisfactory characteristics and performance of the image processing system.

The television signal amplitude is prescribed such that a ratio of the video signal amplitude to the sync signal amplitude is 0.7:0.3. However, the video signal amplitude varies between 0 and 0.7 V, so that the detection as to whether the television signal amplitude is within the prescribed amplitude range is usually done with respect to the horizontal sync signal amplitude. However, in the color television signal the horizontal synchronizing signal interval (including a front porch, a horizontal sync signal period and a back porch) contains the color burst. Therefore, where the sync signal amplitude detection is made within the horizontal synchronizing signal interval, only a very short period is available for the sync signal amplitude detection. This means that a sync separator capable of accurately detecting the horizontal sync signal position in the television signal is necessary, thus complicating the circuit construction.

Such a prior art signal detection circuit is seen in U.S. Pat. No. 3,706,847 wherein the peak of a horizontal sync signal fed from a terminal (reference numeral 1 in FIG. 1) is detected by a peak detector (9), and the porch level is detected by a porch detector (5), whereby a medium value of outputs of these two detectors is detected by a circuit (19).

Further, in the case of a simplified color television camera, color burst sometimes fails to be inserted in a regular position. In such a case, erroneous detection of the sync signal amplitude would result even by using a sync separator which can accurately detect the horizontal sync signal position.

SUMMARY OF THE INVENTION

An object of the invention is to provide a television signal amplitude detection circuit of a simple circuit construction dispensing with any sync separator, which detection circuit can assure precise and stable detection of television signal amplitude.

According to the invention, the vertical synchronizing signal interval (including a vertical sync pulse period and equalizing pulse periods preceding and succeeding the vertical sync pulse period) of the television signal, more particularly a period including the vertical sync pulse period and an equalizing pulse period preceding or succeeding the vertical sync pulse period, is made use of as the detection period.

Specifically, a detection circuit according to the invention comprises a first detection circuit which detects the sync signal amplitude from the difference between the average pedestal level and average vertical sync pulse level in the detection period, and a second detection circuit which determines whether the sync signal amplitude detected by said first detection circuit is within a predetermined permissible range, the detection output of the second detection circuit being representative of detection as to whether the amplitude of the television signal is within a permissible range.

The vertical synchronizing signal interval is devoid of color burst in any color television signal. Thus, the sync signal amplitude detection can be obtained over a wide time range as compared to the prior art television signal amplitude detection circuit in which the sync signal amplitude detection is made in the horizontal synchronizing signal interval. For this reason, there is no need of providing any sync separator that can accurately detect the horizontal sync signal position. It is thus possible to accomplish stable and accurate detection of the television signal amplitude with a simple circuit construction.

BRIEF DESCRIPTION OF THE DRAWINGS

The above and other features and advantages of the invention will become more apparent from the following detailed description having reference to the accompanying drawings, in which.

DESCRIPTION OF PREFERRED EMBODIMENT

Figure 1:
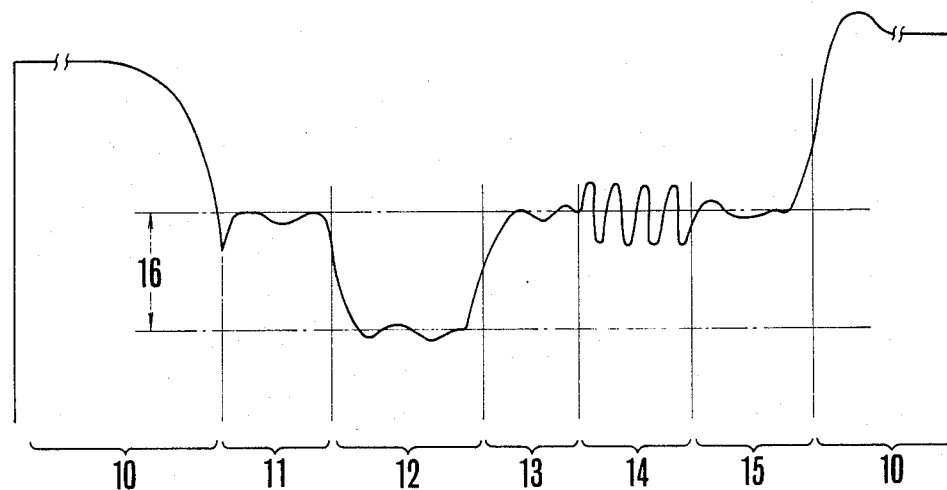
FIG. 1 is a diagram showing the waveform of a color television signal interval.

FIG. 1 shows the waveform of a color television signal in a horizontal synchronizing signal interval. In FIG. 1, a period including a front porch 11, a horizontal sync signal 12, a back porch 13, a color burst 14 and a blanking level portion 15 constitutes the horizontal synchronizing signal interval. Designated at 10 is the video signal portion. The front porch 11 has a duration of $1.55 \pm 0.25$ μsec., the horizontal sync signal 12 has a duration of $4.7 \pm 0.2$ μsec., the back porch 13 has a duration of $0.9 \pm 0.1$ μsec., the color burst 14 has a duration of $2.35 \pm 0.23$ μsec., and the blanking level portion 15 has a duration of $2.25 \pm 0.2$ μsec. As is apparent from FIG. 1, in the horizontal synchronizing signal interval the sync signal amplitude 16 can be detected from the amplitude difference between the horizontal sync signal and the front porch or back porch. In detecting the amplitude difference, the color burst period 14 must be avoided. Also, in a digital processing system for digitally processing television signals, a lowpass filter is usually used to prevent alias noise before digitizing the television signal. In this case, the signal waveform is liable to be deformed in the front porch period, horizontal sync signal period and back porch period due to ringing or like transient response of the filter. Therefore, it is necessary to determine the sync signal amplitude detection position by taking the transient response characteristic of the filter into consideration. In other words, for accurately detecting the sync signal amplitude in the horizontal synchronizing signal interval, the available period for detection is extremely limited.

Figure 2:
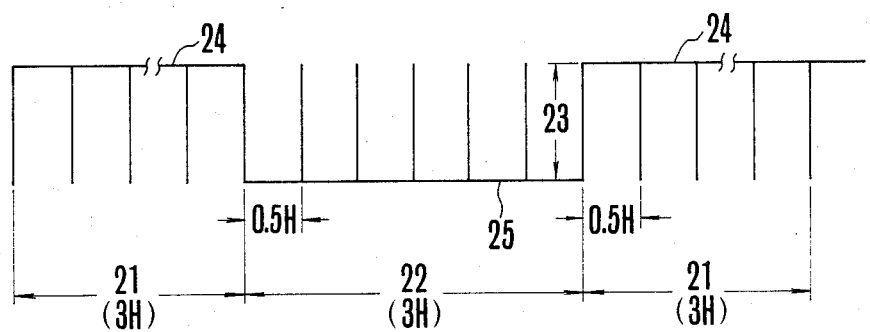
FIG. 2 is a diagram showing the waveform of the color television signal in the vertical synchronizing signal interval.

FIG. 2 shows the signal waveform of television signal in a vertical synchronizing signal interval. In FIG. 2, a preceding equalizing pulse portion 21 (corresponding to 3 H), a vertical sync pulse portion 22 (corresponding to 3 H) and a succeeding equalizing pulse portion 21 (corresponding to 3 H) are totalized into 9 H(572 $\mu$m) of the vertical synchronizing signal interval, where H represents a period from the start of one horizontal scanning line till the start of the next horizontal scanning line, and the pulse width of individual pulses is about 0.5 H (31.8 $\mu$sec). This vertical synchronizing signal interval is devoid of the color burst. In this interval, the sync signal amplitude 23 can be detected at a position sufficiently free from the influence of the transient response of the filter. Thus, it is possible to detect the television signal amplitude precisely and stably. Designated at 24 in FIG. 2 is a pedestal level, and at 25 a vertical sync pulse level.

FIG. 3A is a block diagram showing one embodiment of a television signal amplitude detection circuit according to the invention. In this embodiment, the analog signal is converted into the digital signal for detection of sync signal amplitude, but the application of the invention is not limited to such a digital processing.

Figure 3:
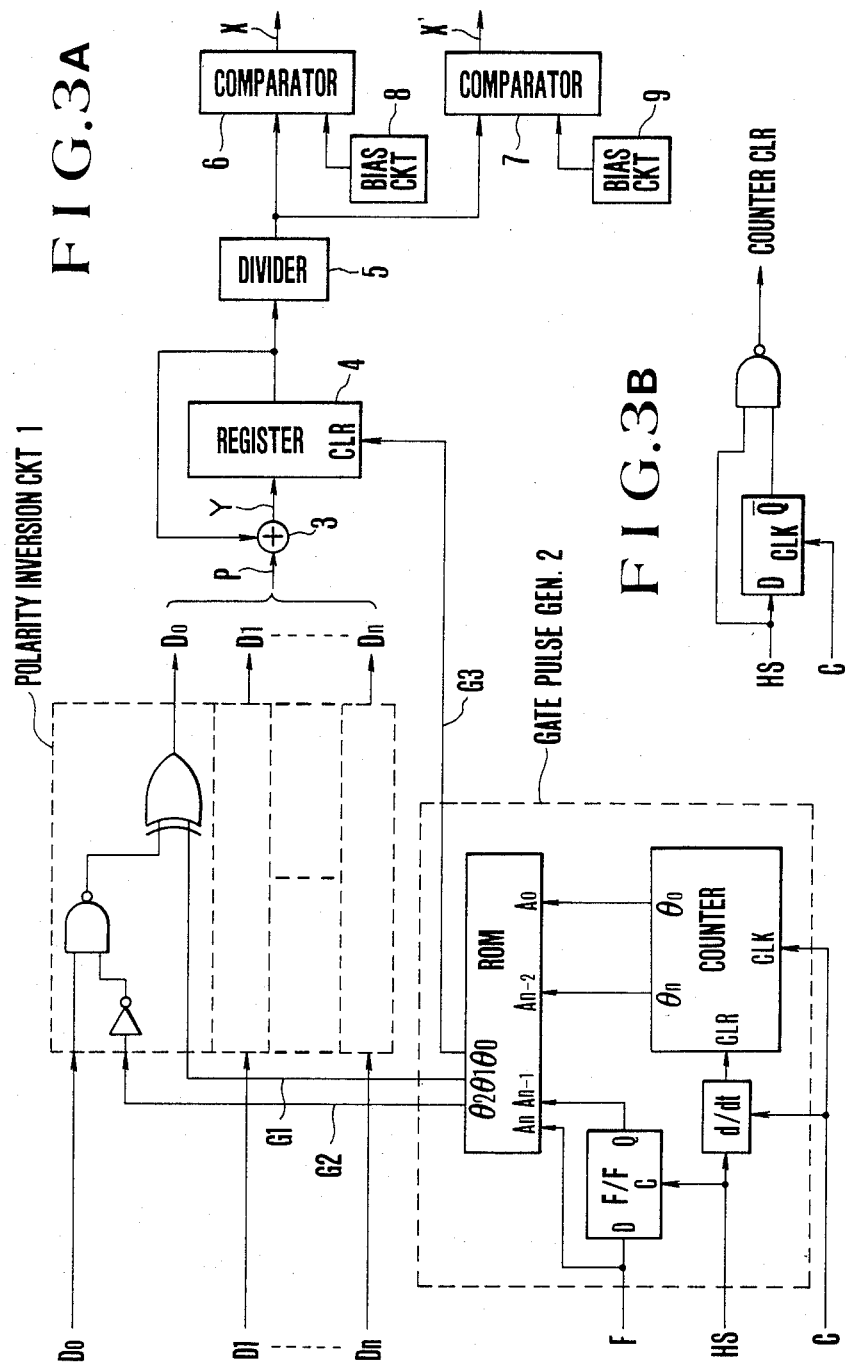
FIG. 3A is a block diagram showing an embodiment of a television signal amplitude detection circuit according to the invention.
FIG. 3B is a diagram showing a component element of the FIG. 3A detection circuit.

The television signal amplitude detection circuit in the embodiment of FIG. 3 comprises a polarity inversion circuit 1, a gate pulse generator 2, an adder 3, a memory or register 4, a divider 5, a first comparator 6, a second comparator 7, a first bias circuit 8, and a second bias circuit 9. The polarity inversion circuit 1, gate pulse generator 2, adder 3, memory 4 and divider 5 constitute a first detection circuit, which serves to detect the sync signal amplitude from the difference between the average pedestal level and average vertical sync pulse level in a period including the vertical sync pulse portion and an equalizing pulse portion preceding or succeeding the vertical sync pulse portion in a television signal. The first and second comparators 6 and 7 and the first and second bias circuits 8 and 9 constitute a second detection circuit, which serves to determine whether the sync signal amplitude detected by the first detection circuit is within a predetermined permissible range. In this embodiment, the detection output of the second detection circuit (i.e., output X or X' in FIG. 3) is representative of detection as to whether the television signal amplitude is within the permissible range.

A television signal as represented by an input data D ($D_0, D_1 \ldots D_n$; n being a positive integer), for example, a PCM signal is supplied to the polarity inversion circuit 1. The polarity inversion circuit 1 produces outputs under the control of control pulses G1 and G2 supplied from the gate pulse generator 2. More particularly, the circuit 1 produces an output data ($-a1, -a2 \ldots -aN$ in FIG. 4) obtained as a result of polarity inversion of N samples (N being a positive integer; $N<n$) of the vertical sync pulse level (25 in FIG. 2) in a predetermined vertical sync pulse period (22 in FIG. 2). The circuit 1 also produces an output data (b1, b2 ... bN in FIG. 4) of N samples of the pedestal level (24 in FIG. 2) without polarity inversion in a predetermined equalizing pulse period (21 in FIG. 2). During the other period, the circuit 1 produces an output data of zero level.

The output of the polarity inversion circuit 1 is supplied to the adder 3. The adder 3 calculates the sum of this output and the output of the memory 4. The output of the adder 3 is supplied to the memory 4 for being stored in the memory 4 for one clock period. The output of the memory 4 is obtained by delaying the output of the adder 3 by one clock period, and it is supplied to the divider 5 and returned to the adder 3. The content stored in the memory 4 is forcibly cleared to zero under the control of a control pulse G3 which is supplied from the gate pulse generator 2 at a predetermined phase for each frame of the television signal.

Thus, the difference between the summation of N samples of the pedestal level in the equalizing pulse period and the summation of N samples of the vertical sync pulse level in the vertical sync pulse period is calculated through the polarity inversion circuit 1, adder 3 and memory 4, and it is delivered out of the memory 4 for every frame. The output of the memory 4 is supplied to the divider 5 and multiplied thereat by 1/N. Thus, the average value of the sync signal amplitude (23 in FIG. 2) in the vertical synchronizing signal interval of the television signal, i.e., the difference between the pedestal level and the vertical sync pulse level is obtained as the output of the divider 5 which is supplied to the first and second comparators 6 and 7.

The first comparator 6 compares the average sync signal amplitude calculated by the divider 5 with a first reference value supplied from the first bias circuit 8 and representing a predetermined maximum permissible value of the sync signal amplitude. If the average sync signal amplitude supplied from the divider 5 is greater than the first reference value, the first comparator 6 provides a signal X indicating that the input television signal amplitude is excessive.

The second comparator 7 compares the average sync signal amplitude supplied from the divider 5 with a second reference value supplied from the second bias circuit 9 and representing a predetermined minimum permissible value of the sync signal amplitude. If the average sync signal amplitude supplied from the divider 5 is less than the second reference value, the second comparator 7 provides a signal X' indicating that the input television signal amplitude is insufficient.

Figure 4:
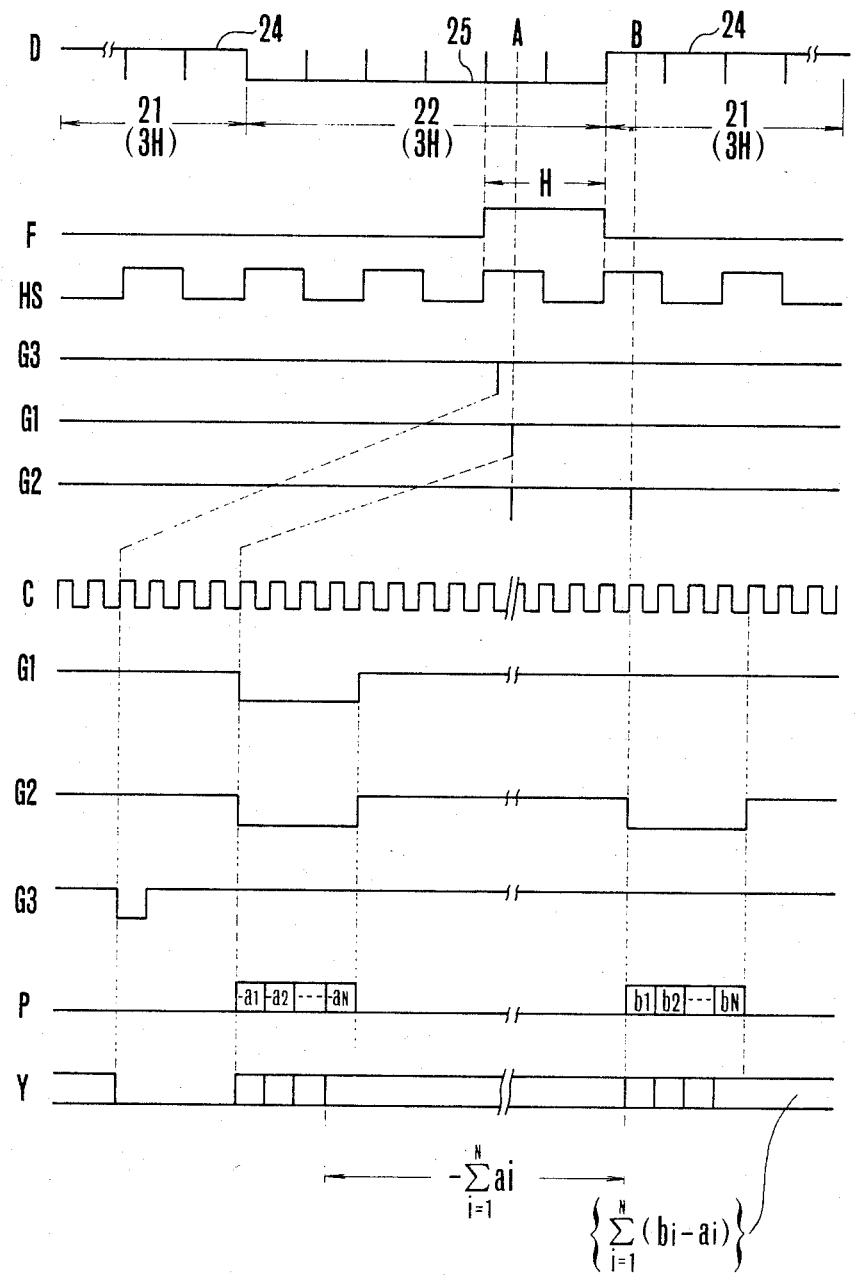
FIG. 4 is a time chart representing signals appearing in the television signal amplitude detection circuit shown in FIG. 3A.

The operation of the individual circuits of the embodiment of FIG. 3A will now be described with reference to FIG. 4. In FIG. 4, reference characters D, F, HS, G1, G2, G3, C, P and Y represent signals shown by the same reference characters in FIG. 3A.

The signal D in FIG. 4 represents the data waveform of television signal in the vertical synchronizing signal interval. The signal F is a frame pulse, the signal HS is a horizontal sync pulse, and the signal C is a clock pulse, these pulses being generated in the television device as well known in the art.

In the embodiment as shown in FIG. 3A, the gate pulse generator 2 includes a read only memory (ROM), a D-type flip-flop, a differentiator, and a binary counter. The contents of the ROM partly correspond to the vertical synchronizing position to be detected and partly correspond to the detection position within the vertical synchronizing position. The differentiator has a D-type flip-flop and a NAND gate circuit as shown in FIG. 3B.

The D-type flip-flop receives the frame pulse F and horizontal sync pulse HS and produces a Q output applied to an input terminal $A_{n-1}$ of the ROM. The frame pulse F is also applied to an input terminal $A_n$ of the ROM. Since the input terminals $A_{n-1}$ and $A_n$ correspond to addresses of the ROM having values of the vertical synchronizing position to be detected, the desired vertical synchronizing position is determined in synchronism with the frame pulse F and horizontal sync pulse HS.

The differentiator receiving the horizontal sync pulse HS and clock pulse C produces a clear pulse for the counter in synchronism with these pulses. The counter then counts, in accordance with the clock pulse C, addresses of the ROM corresponding to input terminals $A_0$ to $A_{n-2}$ and having values of the detection position within the vertical synchronizing position. Thus, when the binary outputs of the counter delivered out of terminals $\theta_0$ to $\theta_n$ thereof coincide with the values of the detection position, control pulses $G_1$, $G_2$ and $G_3$ are delivered out of the ROM via terminals $\theta_1$, $\theta_2$ and $\theta_0$ as shown in FIG. 4.

Respective input data $D_0, D_1 \ldots D_n$ are passed through each logical circuit section of polarity inversion circuit 1 having an inverter, a NAND gate and an exclusive-OR gate so that they are controlled by the control pulses G1 and G2 as shown at P in FIG. 4. More particularly, while the control pulses G1 and G2 are both at a "high" level, zero is provided; while the control pulses G1 and G2 are both at a "low" level, outputs $-a1, -a2, \ldots, -aN$ obtained by inverting the polarity of N samples a1, a2, ... aN of the television signal input to the polarity inverter 1 are provided; and while the control pulse G1 is at the "high" level and the conrol pulse G2 is at the "low" level, N samples b1, b2, ... bN of the input television signal are directly provided.

As is seen from FIG. 4, the signals a1, a2, ... aN represent respective N samples of the sync level with respect to point A, while the signals b1, b2, ... bN represent respective N samples of the pedestal level with respect to point B.

The contents stored in the memory 4 are forcibly cleared to zero under the control of the control pulse G3 generated for every frame. Subsequently, the signal P shown in FIG. 4 is supplied to the adder 3. As the signals $-a1, -a2, \ldots -aN$ are successively supplied to it, the adder 3 sequentially provides outputs $-a1, -(a1+a2), -(a1+a2+a3), \ldots -(a1+a2+ \ldots +aN)$, as shown at Y in FIG. 4. After the application of the signal $-aN$, zero is supplied so that $$-\sum_{i=1}^{N} ai$$

is held until the signals b1, b2, ... bN are supplied. When the signals b1, b2, ... bN are subsequently supplied successively, the adder 3 sequentially provides outputs $$b1 - \sum_{i=1}^{N} ai, (b1 + b2) - \sum_{i=1}^{N} ai,$$

.... Finally, an output $$\sum_{i=1}^{N} (bi - ai)$$

is provided, and this signal is held until the appearance of the next control pulse G3. That is, $$\sum_{i=1}^{N} (bi - ai)$$

is calculated for every frame.

The signal Y shown in FIG. 4 is delayed by one clock in the memory 4, and the output thereof is multiplied by 1/N in the divider 5. Thus, an output $$1/N \sum_{i=1}^{N} (bi - ai)$$

is delivered out of the divider 5. More particularly, the sync signal amplitude as the average of N samples in the vertical synchronizing signal interval is produced from the divider 5.

While in the above embodiment the amplitude difference between the vertical sync pulse level at point A in the vertical sync pulse period and the pedestal level at point B in the equalizing pulse period has been calculated to detect the sync signal amplitude in the vertical synchronizing signal interval, these points A and B are by no means limitative, and any two points may be selected so long as these points concern the vertical sync pulse level and pedestal level in the vertical synchronizing signal interval.

As has been made apparent from the foregoing, according to the invention it is possible to obtain stable and accurate detection of television signal amplitude with a simple circuit construction.

What is claimed is:

1. A television synchronizing signal amplitude detection circuit for detecting the amplitude of an input composite television signal comprising a first detection circuit for detecting the sync signal amplitude from the difference between an average of a first level and an average of a second level in a detection interval including a vertical sync pulse period and an equalizing pulse period preceding or succeeding said vertical sync pulse period of the television signal, and a second detection circuit for determining whether said sync signal amplitude detected by said first detection circuit is within a predetermined permissible range, the detection output of said second detection circuit being representative of detection as to whether the amplitude of the composite television signal is within a permissible range.

2. A television synchronizing signal amplitude detection circuit according to claim 1 wherein said first level is a pedestal level and said second level is a vertical sync pulse level.

3. A television synchronizing signal amplitude detection circuit according to claim 1 wherein said first detection circuit comprises:
  a gate pulse generator responsive to a frame pulse, a horizontal sync pulse and a clock pulse, for generating first to third gate pulses for determination of detection position within the detection interval;
  a polarity inversion circuit receiving an input data and being responsive to said first and second gate pulses to produce a polarity-inverted output of the input data when said gate pulses are in a first level relationship, a polarity-non-inverted output when said gate pulses are in a second level relationship, and a zero output when said gate pulses are in a third level relationship;
  an adder receiving the output of said polarity inversion circuit for sequentially adding an output of a succeeding memory and the output of said polarity inversion circuit, said memory being cleared by said third gate pulse; and a divider for dividing the sum output of the preceding stage to produce an average value, and wherein said second detection circuit comprises:

a first comparator for comparing the average value with a first reference value representative of a maximum permissible value; and a second comparator for comparing the average value with a second reference value representative of a minimum permissible value.

4. A television synchronizing signal amplitude detection circuit according to claim 3 wherein said first and second gate pulses are in the same level of one polarity in said first level relationship, in different levels in said second level relationship and in the same level of the other polarity in said third level relationship.

* * * * *